(12) United States Patent
Nakamura (10) Patent No.: US 9,469,161 B2
(45) Date of Patent: Oct. 18, 2016

(54) PNEUMATIC TIRE FOR HEAVY LOAD

(71) Applicant: BRIDGESTONE CORPORATION, Chuo-ku, Tokyo (JP)

(72) Inventor: Shinsuke Nakamura, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 71 days.

(21) Appl. No.: 13/930,131

(22) Filed: Jun. 28, 2013

(65) Prior Publication Data

US 2014/0000776 A1  Jan. 2, 2014

(30) Foreign Application Priority Data

Jun. 29, 2012  (JP) .................. 2012-147944

(51) Int. Cl.
| | |
|---|---|
| B60C 11/11 | (2006.01) |
| B60C 11/13 | (2006.01) |
| B60C 11/03 | (2006.01) |

(52) U.S. Cl.
CPC ............ B60C 11/11 (2013.01); B60C 11/0311 (2013.04); B60C 11/0316 (2013.04); B60C 11/1369 (2013.04); B60C 2011/0351 (2013.04); B60C 2011/0362 (2013.04); B60C 2200/06 (2013.04); B60C 2200/065 (2013.04)

(58) Field of Classification Search
CPC .............. B60C 11/11; B60C 11/1369; B60C 11/0311; B60C 2011/0367; B60C 2011/0355; B60C 2011/0379; B60C 2200/06; B60C 2200/065; B60C 11/1376
USPC ....................... 152/209.15, 209.22
See application file for complete search history.

(56) References Cited

U.S. PATENT DOCUMENTS

| | | | | |
|---|---|---|---|---|
| 5,031,680 A | * | 7/1991 | Kajikawa et al. | 152/209.18 |
| 5,269,357 A | * | 12/1993 | Killian | 152/209.2 |
| 7,093,630 B2 | * | 8/2006 | Kimishima et al. | 152/209.14 |

FOREIGN PATENT DOCUMENTS

| | | | |
|---|---|---|---|
| JP | 10-278513 A | | 10/1998 |
| JP | 11-048717 | * | 2/1999 |
| JP | 11-048717 A | | 2/1999 |
| JP | 2001-055017 | * | 2/2001 |

(Continued)

OTHER PUBLICATIONS

English machine translation of JP11-048717, Feb. 1999.*

(Continued)

Primary Examiner — Steven D Maki
Assistant Examiner — Robert Dye
(74) Attorney, Agent, or Firm — Sughrue Mion, PLLC (57) ABSTRACT

A pneumatic tire for heavy load has a tread, circumferential grooves (2) extending continuously in the tread circumferential direction, transverse grooves (5) opening to the circumferential grooves (2) adjacent each other in the tread width direction, and a block (6) defined by the circumferential grooves (2) and the transverse grooves (5) on a surface (1) of the tread. The block (6) is provided with one or more shallow grooves (7-9) having an average groove depth shallower than a groove depth of the circumferential grooves (2) adjacent to the block (6). The average groove depth of the shallow grooves (7-9) is greater than 20% and less than 80% of the groove depth of the circumferential grooves (2). At least one of the shallow grooves (7-9) opens to at least one of the transverse grooves (5) and the circumferential grooves (2) adjacent to the block (6).

9 Claims, 7 Drawing Sheets

(56) References Cited

FOREIGN PATENT DOCUMENTS

| | | | |
|---|---|---|---|
| JP | 2001-055017 A | | 2/2001 |
| JP | 2010-125999 | * | 6/2010 |
| JP | 2010-125999 A | | 6/2010 |
| JP | 2012-030658 A | | 2/2012 |
| JP | 2012-076658 A | | 4/2012 |
| JP | 2012-086659 A | | 5/2012 |
| RU | 2336180 C1 | | 10/2008 |

OTHER PUBLICATIONS

English machine translation of JP2001-055017, dated Feb. 2001.*
English machine translation of JP2010-125999, dated Jun. 2010.*
Communication dated Nov. 10, 2015 from the Japanese Patent Office in counterpart application No. 2012-147944.

* cited by examiner

PNEUMATIC TIRE FOR HEAVY LOAD

TECHNICAL FIELD

The present invention relates to a pneumatic tire for heavy load including, on a tread surface, blocks defined by at least two circumferential grooves extending continuously in a tread circumferential direction and transverse grooves opening to the circumferential grooves adjacent in the tread width direction.

BACKGROUND ART

A conventional example of this type of heavy load tire, used in dump trucks and the like, is recited in Patent Literature 1. Dump trucks, which may be used at locations such as construction sites and mines, are sometimes driven over road surfaces such as muddy areas on which a soft clay layer several centimeters thick has formed on hard ground after a rain.

CITATION LIST

Patent Literature

PTL 1: JP10278513A

SUMMARY OF INVENTION

When driven on a road surface with such a clay layer formed thereon, the tread portion of the tires mounted on a vehicle does not completely sink into the clay layer, yet the tires rotate with load applied thereon while being sunk to several dozen percent of the depth of circumferential grooves provided on the tread surface. In this case, the soft clay layer between the tread surface and the hard ground makes it difficult to effectively transmit traction force and braking force to the road surface.

In particular, when the tires rotate with load applied thereon, mud in such a clay layer deposited on the hard ground is pushed out from the leading edge of each block provided on the tread surface, i.e. the edge that contacts the ground first, towards the trailing edge which contacts the ground afterwards. Mud then accumulates between the trailing edge portion and the road surface, resulting in an insufficient traction effect of the block edge at the trailing edge portion of the block on such road surfaces, causing the problem of the vehicle slipping upon application of a breaking force.

This problem reduces the running speed in dump trucks and the like used in mines, for example, leading to delays in transport by such dump trucks and running the risk of a deterioration in operation efficiency.

To address this problem, it is conceivable to achieve a large traction effect with respect to the soft clay layer by increasing the tread width direction component of the edges of the tread surface. If the width direction component is increased by merely adding grooves extending in the tread width direction to the tread surface to partition the blocks, however, the mud from the soft clay layer remaining between the block surface and the road surface in the contact patch causes the tire to slip, thereby preventing the anti-slip effect from being achieved to the desired degree.

Furthermore, another problem occurs in that if the number of circumferential grooves extending continuously in the tread circumferential direction is increased in order to effectively wash out the mud from the clay layer in the contact patch, the circumferential grooves cause the block to be finely defined, reducing the block rigidity and adversely affecting the wear resistance.

The present invention has been conceived in light of such problems with pneumatic tires for heavy load driven in muddy areas, and it is an object thereof to provide a pneumatic tire for heavy load that can effectively enhance mud drainage in the contact patch without leading to a severe deterioration in the block rigidity, which would degrade wear resistance.

A pneumatic tire for heavy load according to the present invention comprises a tread, at least two circumferential grooves extending continuously in a tread circumferential direction, a plurality of transverse grooves opening to the circumferential grooves adjacent to each other in a tread width direction, and a block defined by the circumferential groves and the transverse grooves on a surface of the tread, wherein the block is provided with one or more shallow grooves having an average groove depth shallower than a groove depth of the circumferential grooves adjacent to the block, the average groove depth is greater than 20% and less than 80% of the groove depth of the circumferential grooves adjacent to each block, and at least one of the one or more shallow grooves opens to at least one of the transverse grooves and the circumferential grooves adjacent to the block.

Here, the "surface of the tread" refers to the outer circumferential surface, around the whole circumference of the tire, that contacts with the road surface when the tire is rotated after mounting on an applicable rim with specified air pressure and a load corresponding to the maximum load capability applied. "Tread edges" refer to the outermost positions in the tread width direction on the tread surface.

An "applicable rim" refers to a standard rim specified by the standards below in accordance with tire size. "Specified air pressure" refers to air pressure specified by the standards below in accordance with the maximum load capability. The "maximum load capability" refers to the maximum mass that the tire is allowed to bear according to the standards below. The standards are determined by valid industrial standards for the region in which the tire is produced or used, such as "The Tire and Rim Association, Inc. Year Book" in the United States of America, "The European Tyre and Rim Technical Organization Standards Manual" in Europe, and the "JATMA Year Book" of the Japan Automobile Tire Manufacturers Association in Japan.

The above "groove depth" refers to the depth from the groove opening, i.e. the position at which the groove opens onto the tread surface, to the groove bottom and is measured parallel to the tire radial direction for a tire mounted on an applicable rim, with specified internal pressure and no load applied.

The "average groove depth" of the shallow groove refers to the average value of the groove depth along the entire length of the one or more shallow grooves in each block in the case that the groove depth varies along the length of the shallow groove. If two or more shallow grooves with different groove depths are provided in each block, at least one of the shallow grooves has a groove depth greater than 20% and less than 80% of the groove depth of the circumferential grooves.

Note that the "shallow groove" of the present invention has a groove width such that in the tread contact patch, the shallow groove is open to the tread surface without the opposing groove walls touching. Here, the "tread contact patch" refers to the portion in the circumferential direction of the tread surface that contacts the ground when the tire is mounted on an applicable rim with specified internal pressure and maximum load capability applied.

According to the pneumatic tire for heavy load of the present invention, the block is provided with at least one shallow groove with an average groove depth greater than 20% and less than 80% of the groove depth of the adjacent circumferential grooves, and at least one of the shallow grooves opens to at least one of the transverse grooves and the circumferential grooves adjacent to the block, thereby allowing for effective enhancement of mud drainage in the contact patch without leading to a severe deterioration in the block rigidity, which would degrade wear resistance.

In the pneumatic tire for heavy load of the present invention, the reason for setting the average groove depth of the one or more shallow grooves provided on the block to be greater than 20% and less than 80% of the groove depth of the circumferential grooves is to guarantee necessary block rigidity and to greatly enhance mud drainage.

In other words, if the average groove depth of the shallow groove is 20% or less of the groove depth of the circumferential grooves, the average groove depth of the shallow groove is too shallow, preventing mud on the block surface in the contact patch from being sufficiently caught in the shallow groove. Conversely, an average groove depth of the shallow groove of 80% or more of the groove depth of the circumferential grooves leads to deterioration of the block rigidity due to the shallow groove having a deep groove depth, resulting in degraded wear resistance.

Here, when the open shallow groove is a circumferential shallow groove opening to both transverse grooves adjacent to the block on either side in the tread circumferential direction, mud from the clay layer on the block surface flows through the circumferential shallow groove opening to both of the transverse grooves adjacent to the block without accumulating at the trailing edge portion, thereby further enhancing the mud drainage in the contact patch. In each block, providing two or more of the circumferential shallow grooves opening to both of the transverse grooves allows for even further enhancement of mud drainage.

When the block is provided with two or more of the shallow grooves including a circumferential shallow groove and a width direction shallow groove, the circumferential shallow groove opening to at least one transverse groove between transverse grooves adjacent to the block on either side in the tread circumferential direction, and the width direction shallow groove having a larger inclination angle with respect to the tread circumferential direction than the circumferential shallow groove, then the effect of enhancing mud drainage with the circumferential shallow groove can be achieved as described above, while also achieving a large traction effect with respect to muddy areas based on the increase in the tread width direction component of the edges due to the width direction shallow groove. According to this structure, therefore, the performance when driving in muddy areas can be effectively enhanced.

When the circumferential grooves are zigzag circumferential grooves that zigzag in the tread circumferential direction, the width direction component of the edges can be increased as compared to straight circumferential grooves, thereby enhancing the traction effect with respect to slippage in the circumferential direction.

When each transverse groove includes a bent portion at which the transverse groove bends, the faces of the groove walls near the bent portion mutually suppress bulging in the contact patch, thereby increasing the contact pressure at the edge portions and yielding a further enhanced traction effect.

When a maximum length Lb of the block in the tread circumferential direction and a circumferential distance Lm between circumferential end points along outermost edges, in the tread circumferential direction, of the shallow groove in each block satisfy the relationship Lm/Lb>0.25, the mud drainage at the block surface in the contact patch can be effectively enhanced.

On the other hand, if Lm/Lb≤0.25, the circumferential length of the shallow groove in each block is too short with respect to the circumferential length of the block, causing the time during which mud flows in the shallow groove to be too short with respect to the contact time during which the block contacts the ground successively from the leading edge portion to the trailing edge portion. Mud therefore cannot be effectively caught in the shallow groove, resulting in mud remaining on the block surface and causing the risk of an insufficient slippage suppression effect.

Furthermore, when an area Ab of the region enclosed by the perimeter of the block and a total groove area Am of the shallow groove in the block satisfy the relationship Am/Ab>0.20, the groove area of the shallow groove for catching mud on the block surface can be guaranteed, thus greatly enhancing mud drainage in the contact patch.

Conversely, when Am/Ab≤0.20, the groove area of the shallow groove is small with respect to the surface area of each block, thus preventing mud on the block surface from sufficiently being caught in the shallow groove and running the risk of an insufficient slippage suppression effect due to the mud remaining on the block surface.

When a length Eb of a projection in the tread width direction of an edge of the block and a length Em of a projection in the tread width direction of an edge of the shallow groove satisfy the relationship Em/Eb>0.8, the traction performance and braking performance can be greatly enhanced during driving in muddy areas due to the increase in the width direction component of the edges resulting from the shallow groove in each block. On the other hand, while the above-described function of the shallow groove catching mud on the block surface can be achieved when Em/Eb≤0.8, the width direction component of the edges of the shallow groove does not increase as much, thus leading to the risk of not achieving the desired edge effect with the shallow groove.

BRIEF DESCRIPTION OF DRAWINGS

The present invention will be further described below with reference to the accompanying drawings, wherein.

DESCRIPTION OF EMBODIMENTS

Embodiments of the present invention will be described based on the drawings.

Figure 1:
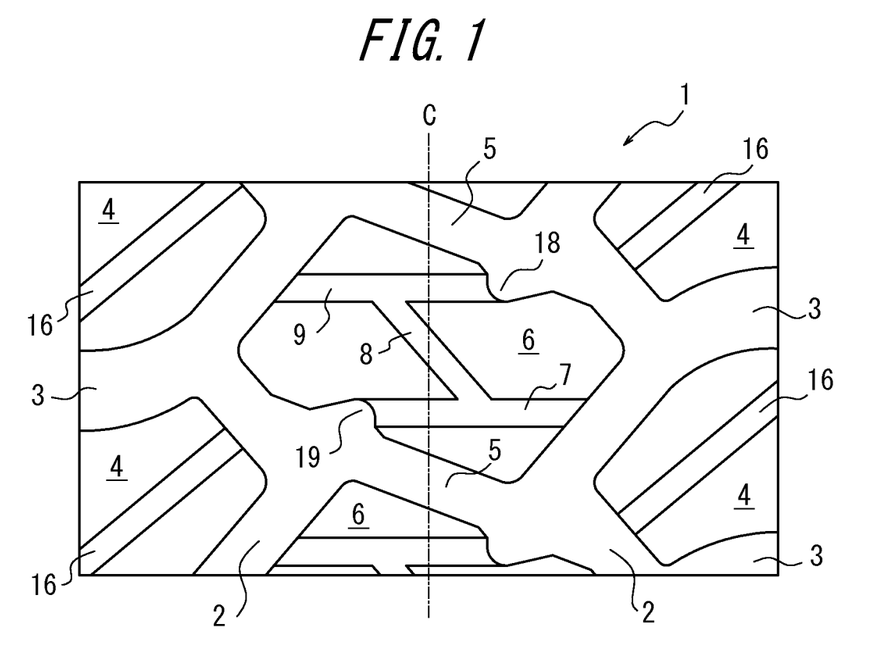
FIG. 1 is a partial development view of a tread pattern illustrating Embodiment 1 of the present invention.

FIG. 1 illustrates a tread surface provided on a pneumatic tire for heavy load according to Embodiment 1 of the present invention.

While omitted from FIG. 1, this pneumatic tire includes, like a regular pneumatic tire, a pair of bead portions each having a bead core embedded therein, a carcass with, for example, a radial structure formed by one or more plies extending from the bead portions along sidewall portions to a tread portion, a belt provided on the outside of the carcass in the tire radial direction, tread rubber provided on the outside of the belt in the tire radial direction and including a tread surface 1 on the outer circumference thereof, and the like.

Here, the tire illustrated in FIG. 1 preferably has, on the tread surface 1, circumferential grooves 2 (here, two grooves) that extend continuously in the tread circumferential direction and that preferably have a zigzag pattern, bending back and forth at multiple locations along the tread circumferential direction as shown in FIG. 1, and lug grooves 3 that effectively extend in the tread width direction and that open to the circumferential grooves 2 and to tread edges (not shown in the figures). Furthermore, on the tread surface 1, lugs 4 are land portions located outside the circumferential grooves 2 in the tread width direction and are defined by lug grooves 3 adjacent in the tread circumferential direction.

Note that in addition to the zigzag pattern illustrated in FIG. 1, the circumferential grooves, of which three or more may be provided, may extend in the form of a saw-tooth, a wave, a crank, or the like, or the circumferential grooves may extend in a straight line in the tread circumferential direction.

Here, transverse grooves 5, for example, are provided between two circumferential grooves 2, at an inclination with respect to the tread circumferential direction and opening to both of the circumferential grooves 2. The transverse grooves 5 partition the land portion between the two circumferential grooves 2 on a tire equatorial plane C into a plurality of blocks 6.

In the present embodiment, each block 6 defined by the circumferential grooves 2 and the transverse grooves 5 is provided with, for example, three shallow grooves 7, 8, 9 having an average groove depth shallower than the groove depth of the circumferential grooves 2 adjacent to the block 6. The average groove depth of the shallow grooves 7-9 is set to be greater than 20% and less than 80% of the groove depth of the circumferential grooves 2, and at least one of the shallow grooves (two in FIG. 1) opens to the adjacent circumferential grooves 2.

According to the above structure, when the tire is driven on a road surface on which a soft clay layer has formed on hard ground after a rain, mud from the clay layer on the blocks 6 is caught in the shallow grooves 7-9 provided on the blocks 6 and flows to the circumferential grooves 2 or the transverse grooves 5 into which the shallow grooves 7, 9 open. Mud on the block surface can therefore be efficiently eliminated, thereby effectively enhancing the mud drainage of the tread surface 1.

Moreover, as a result of the function, fulfilled by the shallow grooves 7-9 in the blocks 6, of eliminating mud on the block surface, mud does not remain on the trailing edge portion of the block surface. Therefore, the edge effect at the trailing edge portion can be sufficiently achieved in order to effectively transmit traction force and braking force to the road surface.

When two or more of the shallow grooves 7-9 are provided, as in the tire in FIG. 1, at least one of the shallow grooves 7-9 preferably opens to at least one of the circumferential grooves 2 and the transverse grooves 5, and the shallow groove 8 that does not open to either the circumferential grooves 2 or the transverse grooves 5 preferably opens to the other shallow grooves 7, 9.

Here, the amount of mud that is pushed out towards the trailing edge portion on the block surface is proportional to the surface area of each block 6, and the amount of mud caught in the shallow grooves 7-9 is determined by the total groove area and the groove depth of the shallow grooves 7-9. Therefore, from the perspective of more effectively enhancing mud drainage with the shallow grooves, the average groove depth of the shallow grooves 7-9 is set to be more than 20% of the groove depth of the circumferential grooves 2. On the other hand, a groove depth of the shallow grooves 7-9 that is too deep leads to deterioration of the rigidity of the blocks 6. The average groove depth of the shallow grooves 7-9 is thus set to be less than 80% of the groove depth of the circumferential grooves 2.

From a similar perspective, the area Ab of the region enclosed by the perimeter of each block 6 in plan view, i.e. the area Ab yielded by adding the surface area of the block 6 and the groove area of the shallow grooves 7-9 provided in the block 6, and the total groove area Am of the shallow grooves 7-9 in the block 6 preferably satisfy the relationship Am/Ab>0.20. As a result, the volume necessary for the shallow grooves 7-9 to catch mud from the block surface can be guaranteed.

By providing such shallow grooves 7-9 on each block 6, when the tires rotate with load applied thereon, mud is reliably caught in the shallow grooves 7-9 within the contact time during which the block 6 contacts the ground successively from the leading edge portion to the trailing edge portion. Therefore, as shown in the expanded view in FIG. 2, the length of the shallow grooves 7-9 in the tread circumferential direction is preferably guaranteed by setting the maximum length Lb of the block 6 in the tread circumferential direction and the circumferential distance Lm between circumferential end points P1 and P2 along the outermost edges, in the tread circumferential direction, of the shallow grooves 7-9 to satisfy the relationship Lm/Lb>0.25.

The maximum circumferential length Lb of the block, the circumferential distance Lm between circumferential end points of the shallow grooves, the area Ab of the region enclosed by the perimeter of the block, the total groove area Am of the shallow grooves, and the below-described length Eb of a projection in the tread width direction of a block edge and length Em of a projection in the tread width direction of an edge of the shallow groove are measured along the tread surface, in a development view of the tread pattern, for a tire mounted on an applicable rim with specified internal pressure and no load applied.

Figure 2:
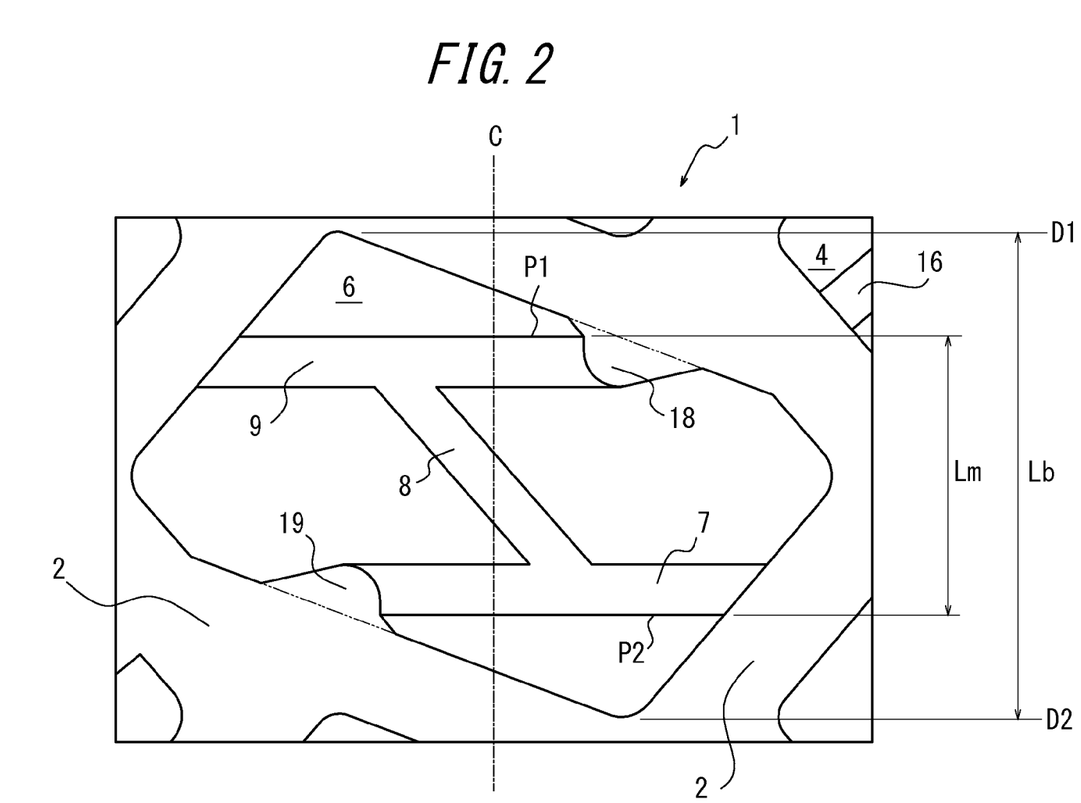
FIG. 2 illustrates an enlargement of the relevant portion of the pattern in FIG. 1.

Note that in the patterns illustrated in FIGS. 1 and 2, the shallow grooves 7, 9 located outwards in the tread circumferential direction in the block 6 both extend in the tread width direction, and thus the circumferential end points P1 and P2 of the shallow grooves 7-9 are, as illustrated in the figures, located on the outer groove edges of the grooves 7, 9 in the tread circumferential direction. After mud in muddy areas is caught in the shallow grooves 7-9, the mud can flow freely in the shallow grooves 7-9. Therefore, when the shallow grooves 7-9 are connected to each other as illustrated in FIG. 2, the circumferential end points P1 and P2 are calculated considering the shallow grooves 7-9 collectively to be one groove. When discontinuous shallow grooves are provided in the blocks, Lm is considered to be the longer of the circumferential distance between circumferential end points of such discontinuous shallow grooves and the circumferential distance between circumferential end points of connected shallow grooves.

The above-described "maximum length Lb of the block 6 in the tread circumferential direction" refers to the block length of the block 6 as measured in the tread circumferential direction from one outermost position D1 in the tread circumferential direction to the other outermost position D2.

Furthermore, in order for the shallow grooves 7-9 to increase the width direction component of the edges and effectively enhance traction performance and braking performance when driving in muddy areas, the length Eb of a projection in the tread width direction of an edge of the block 6 and the length Em of a projection in the tread width direction of an edge of the shallow grooves 7-9 preferably satisfy the relationship Em/Eb>0.8.

The "length of a projection in the tread width direction of an edge" refers to calculating the length of a component of an edge extending in a predetermined direction by projecting the edge onto a line parallel to the tread width direction.

Figure 3:
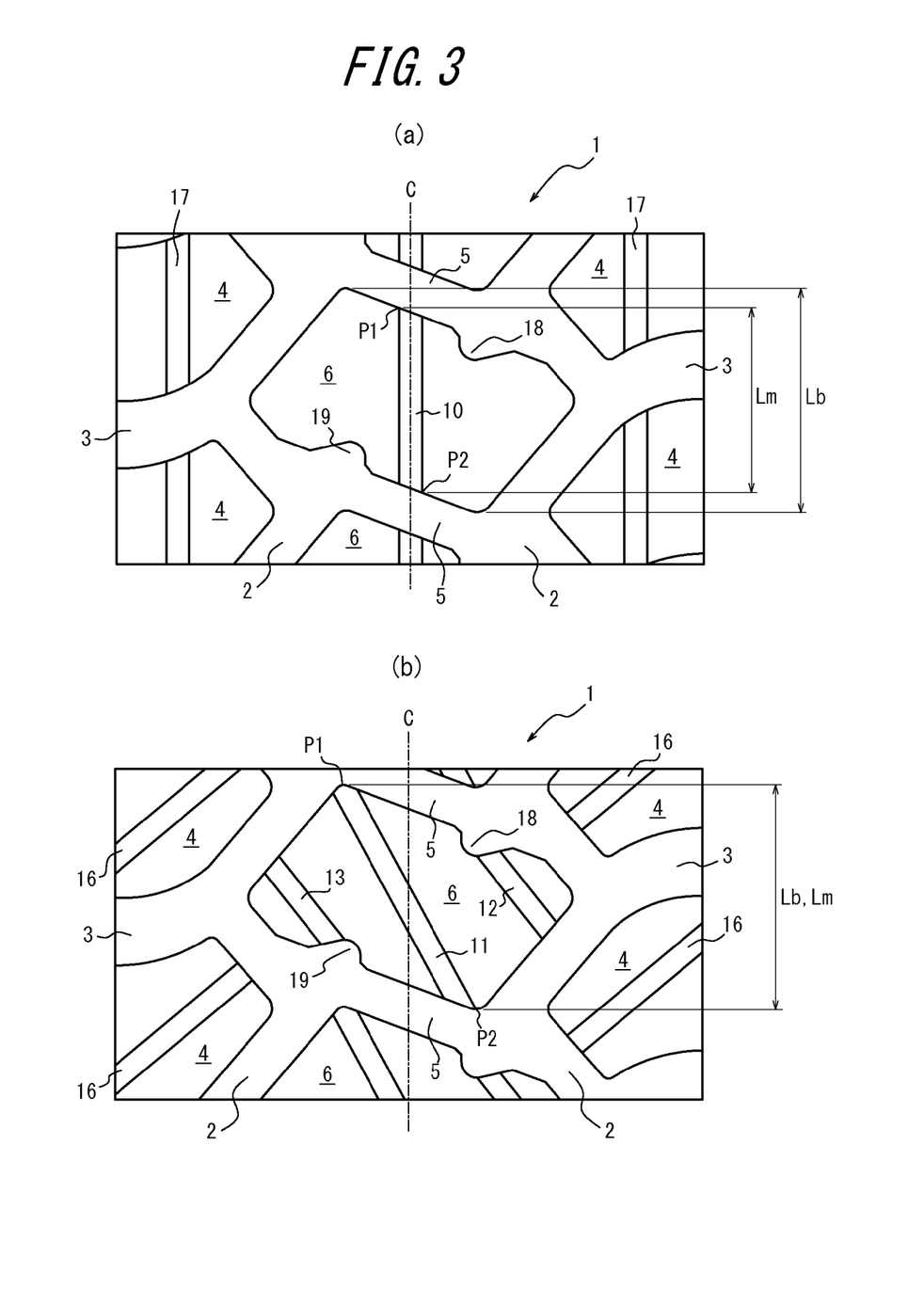
FIG. 3 is similar to FIG. 1 and illustrates another example of arrangement of shallow grooves on each block.

As illustrated in FIG. 3(a), having the shallow groove provided in each block 6 be a circumferential shallow groove 10 that opens to at least one of the transverse grooves 5 adjacent to the block 6 on either side in the tread circumferential direction (here, to both transverse grooves 5) is preferable from the perspective of smoothly eliminating mud on the block surface. Note that the pattern illustrated in FIG. 3(a) shows the circumferential shallow groove 10 extending in the tread circumferential direction along the tire equatorial plane C.

While not illustrated in FIG. 3(a), two or more of such circumferential shallow grooves opening to both transverse grooves are preferably provided, and in addition to the circumferential shallow grooves, a width direction shallow groove having a larger inclination angle with respect to the tread circumferential direction than the circumferential shallow grooves is preferably provided.

On the other hand, as illustrated in FIG. 3(b), it is also possible to provide a circumferential shallow groove 11 that is roughly diagonal to a block 6 in the shape of a parallelogram in plan view. In FIG. 3(b), at both sides of the circumferential shallow groove 11 in the tread width direction, two shallow grooves 12, 13 are provided extending substantially parallel to the circumferential shallow groove 11 yet with a slightly larger inclination with respect to the tread circumferential direction than the circumferential shallow groove 11.

Figure 4:
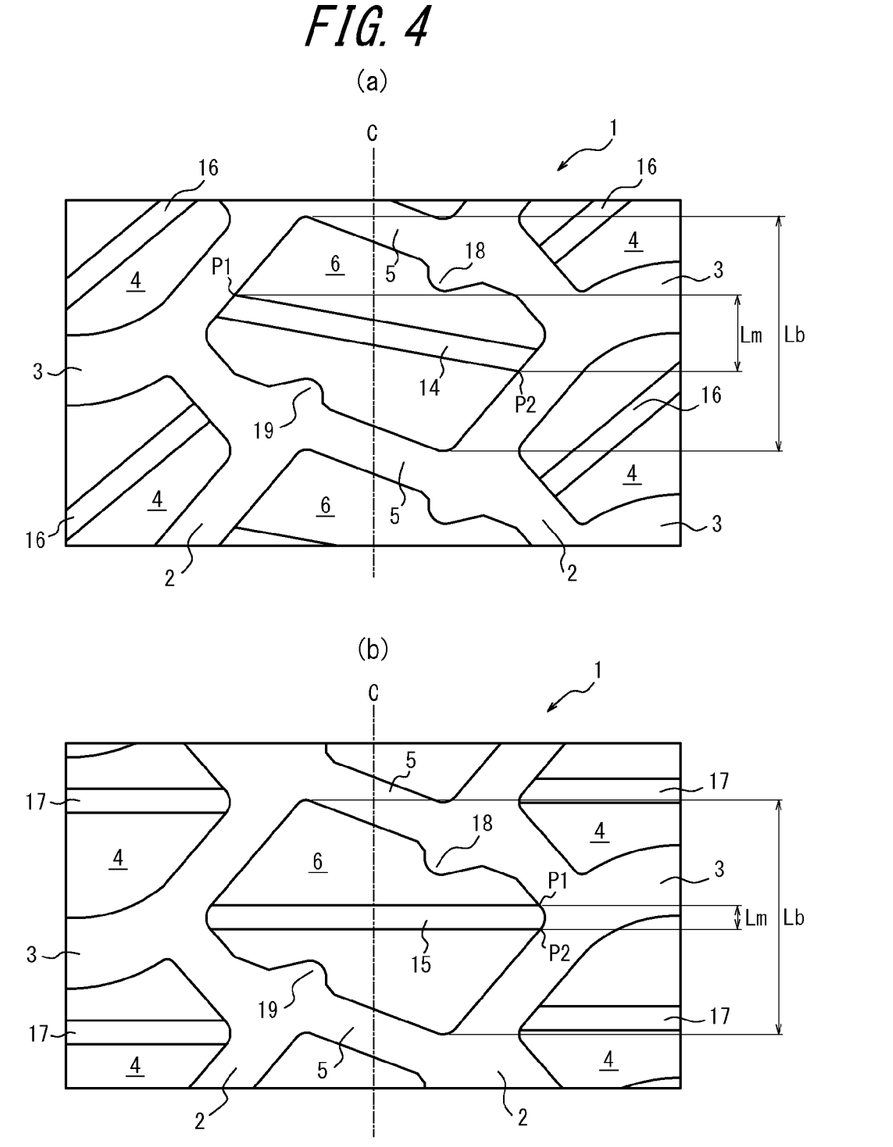
FIG. 4 is similar to FIG. 1 and illustrates yet another example of arrangement of shallow grooves on each block.

Each block 6 may, as illustrated in FIG. 4(a), be provided with a shallow groove 14 extending with a slight inclination with respect to the tread width direction, or as illustrated in FIG. 4(b), with a shallow groove 15 extending parallel to the tread width direction.

Here, the lugs 4 at the tread shoulders may, as illustrated in FIGS. 1, 2, 3(b), and 4(a), be provided with opening grooves 16 that open to the circumferential groove 2 and are inclined with respect to the tread circumferential direction with no relation to the direction of inclination of the shallow grooves provided in the block 6, or as shown in FIGS. 3(a) and 4(b), the lugs 4 may be provided with opening grooves 17 in parallel to the direction of inclination of the shallow grooves. The opening grooves 16, 17 are shallower than the circumferential grooves 2, for example having an average groove depth greater than 20% and less than 80% of the groove depth of the circumferential grooves 2. These opening grooves 16, 17, which can be provided in the lugs 4, contribute to enhancing the mud drainage at the lug surface, like the above-described shallow grooves. Such opening grooves 16, 17, however, are not required in the present invention.

In the above-described embodiment, two concavities 18, 19 that are recessed from the perimeter of the block 6 are provided in each block 6 at locations where the circumferential grooves 2 are bent so as to protrude inwards in the tread width direction. In particular, in the pattern illustrated in FIGS. 1 and 2, one edge of each of the shallow grooves 7, 9 opens to the circumferential groove 2 or the transverse groove 5 at a location where one of the concavities 18, 19 is formed. When calculating the above-described area Ab of the region enclosed by the perimeter of each block 6, not only the shallow grooves, but also the concavities 18, 19 are ignored. The perimeter of the block 6 is smoothly connected by the imaginary line shown in FIG. 2, and the area Ab is calculated by calculating the area of the region enclosed by the block perimeter as connected by the imaginary line.

Figure 5:
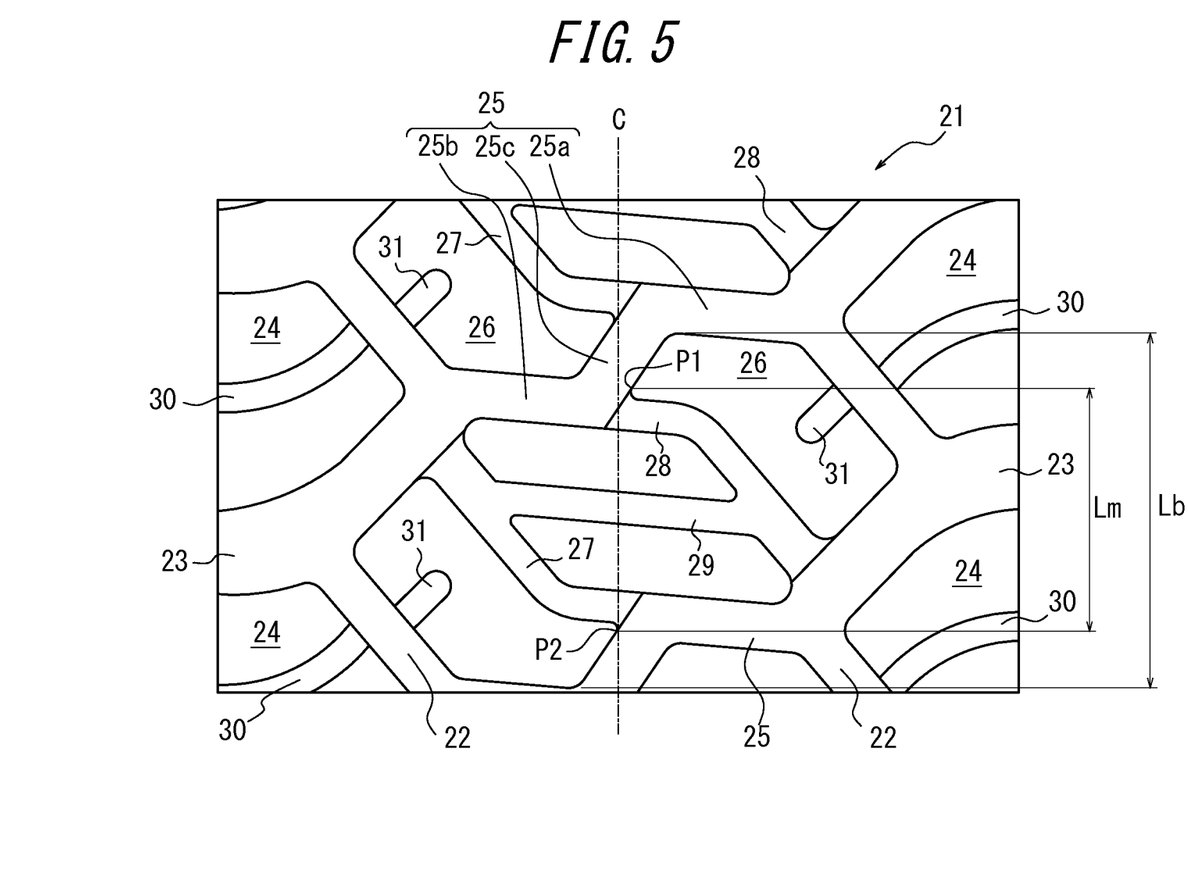
FIG. 5 is a partial development view of a tread pattern illustrating Embodiment 2 of the present invention.

In Embodiment 2 illustrated in FIG. 5, a tread surface 21 is provided with two circumferential grooves 22 that zigzag in the tread circumferential direction and with lug grooves 23 that open to the tread edges and also open to the circumferential grooves 22 at locations where the circumferential grooves 22 are bent so as to protrude outwards in the tread width direction. The circumferential grooves 22 and the lug grooves 23 partition lugs 24. The tread surface 21 is also provided with transverse grooves 25 that extend across the region sandwiched between the two circumferential grooves 22 and open to the circumferential grooves 22 at locations where the circumferential grooves 22 are bent so as to protrude inwards in the tread width direction. The circumferential grooves 22 and the transverse grooves 25 partition blocks 26.

In FIG. 5, each transverse groove 25 is composed of width direction portions 25a and 25b, which extend in parallel to the tread width direction respectively from the locations where the circumferential grooves 22 are bent, and an inclined portion 25c, near the tire equatorial plane C, that extends at an inclination with respect to the tread width direction in order to connect the width direction portions 25a and 25b. The transverse grooves 25 in FIG. 5 each include two bent portions, respectively located where the width direction portions 25a and 25b are connected to the inclined portion 25c. Alternatively, the transverse grooves may each include one bent portion, or three or more bent portions.

The irregularly shaped polygonal blocks 26 defined by the transverse grooves 25 and the circumferential grooves 22, as illustrated in FIG. 5, are provided with circumferential shallow grooves 27, 28 located on either side of the tire equatorial plane C, inclined with respect to the tread circumferential direction and curved partway through, and each opening to one of the zigzag circumferential grooves 22 and to the inclined portion 25c of one of the transverse grooves 25. The blocks 26 are also provided with a width direction shallow groove 29 that has a larger inclination angle with respect to the tread circumferential direction than the circumferential shallow grooves 27, 28, for example extending parallel to the tread width direction, and that opens to the circumferential shallow grooves 27, 28.

The circumferential shallow grooves 27, 28 and the width direction shallow groove 29 provided in each block 6 enhance the mud drainage of the block surface and increase the width direction component of the edges and thus contribute to enhancing performance when driving in muddy areas.

As illustrated in FIG. 5, the circumferential shallow groove 27 is composed of a lower portion that extends in the tread width direction and a portion that extends at an inclination with respect to the tread circumferential direction. Similarly, as illustrated in FIG. 5, the circumferential shallow groove 28 is composed of an upper portion that extends in the tread width direction and a portion that extends at an inclination with respect to the tread circumferential direction. As further illustrated in FIG. 5, the land portion defined by the circumferential shallow grooves 27, 28 and the width direction shallow groove 29 is roughly in the shape of a parallelogram in plan view. This configuration can suppress separation of the land portion.

Furthermore, the sum of the lengths of the circumferential shallow grooves 27, 28 and the width direction shallow groove 29 when projected on a line in the tread width direction is preferably between 100% and 150% of the tread width.

This range is selected because at under 100%, the edge effect is less apparent, whereas upon exceeding 150%, the block rigidity deteriorates.

Note that the "tread width" refers to the distance in the tire width direction between contact edges for a tire mounted on an applicable rim, with specified air pressure and a load corresponding to the maximum load capability applied.

In the pattern illustrated in FIG. 5, each lug 24 is provided with an opening groove 30 that extends in the tread width direction while curving, opens to one of the circumferential grooves 22, and is shallower than the circumferential grooves 22, for example having an average groove depth greater than 20% and less than 80% of the groove depth of the circumferential grooves 22. At a portion outwards in the tread width direction, each block 26 is also provided with a shallow groove 31 positioned opposite the location where the opening groove 30 opens to one of the circumferential grooves 22 and having a shallower groove depth than the circumferential grooves 22.

Example 1

Next, the results of a performance assessment of sample pneumatic tires according to the present invention are described. The size of each sample tire was 27.00 R49.

Example Tires 1-10 had the patterns illustrated in FIG. 3(a), FIG. 7, FIG. 8, FIG. 4(b), FIG. 4(a), FIG. 3(b), FIG. 1, and FIG. 5. The Comparative Tire had the pattern illustrated in FIG. 6.

Each of these sample tires was mounted on a dump truck and run over a route with identical conditions under settings conforming to TRA. After a predetermined time had elapsed, the distance the vehicle had progressed (travel distance) was measured by GPS, and the slip ratio was calculated by comparison with the distance calculated based on the number of tire revolutions (revolution distance). The slip ratio can be calculated with the following equation.

slip ratio=(revolution distance−travel distance)/travel distance

Tables 1 and 2 show the results along with the specifications for each sample tire. Note that the slip property indicated in Tables 1 and 2 is the slip ratio expressed as an index number based on the Comparative Tire. A smaller index indicates less slippage.

The driving time until the tread wore 1 mm was measured based on the remaining groove depth after mounting each sample tire on the vehicle and driving the vehicle. The driving time is indicated as an index number with the driving time of the Comparative Tire as 100. A higher index number indicates better wear resistance.

TABLE 1

Figure 7:
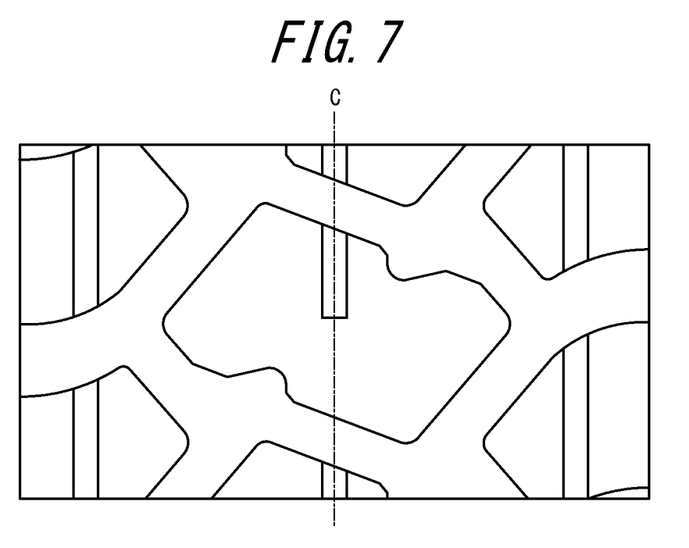
FIG. 7 is a partial development view illustrating a tread pattern of Example Tire 3.
Figure 8:
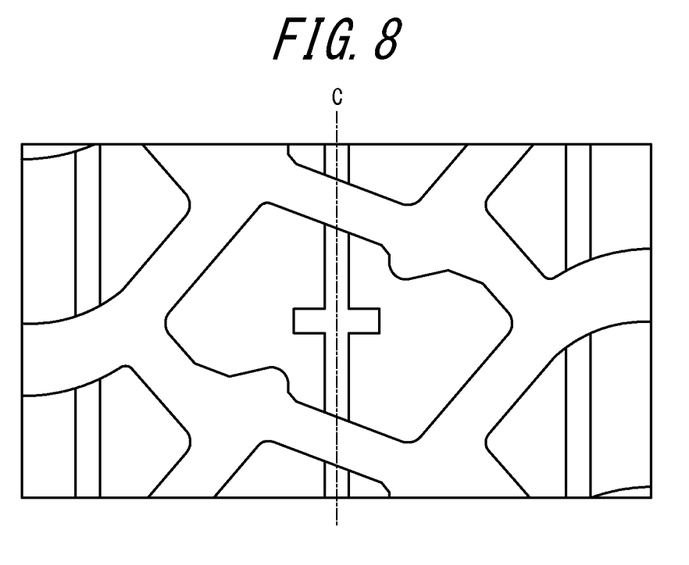
FIG. 8 is a partial development view illustrating a tread pattern of Example Tire 4.

|  | Example Tire 1 | Example Tire 2 | Example Tire 3 | Example Tire 4 | Example Tire 5 | Example Tire 6 |
| --- | --- | --- | --- | --- | --- | --- |
| Pattern | FIG. 3(a) | FIG. 3(a) | FIG. 7 | FIG. 8 | FIG. 4(b) | FIG. 4(a) |
| Lb (mm) | 258 | 258 | 258 | 258 | 258 | 258 |
| Lm (mm) | 203 | 203 | 100 | 203 | 24 | 79 |
| Lm/Lb | 0.79 | 0.79 | 0.39 | 0.79 | 0.09 | 0.31 |
| Ab (mm$^2$) | 53000 | 53000 | 53000 | 53000 | 53000 | 53000 |
| Am (mm$^2$) | 4500 | 9000 | 4500 | 4500 | 8300 | 7600 |
| Am/Ab | 0.08 | 0.16 | 0.08 | 0.08 | 0.16 | 0.14 |
| Groove Depth of Circumferential Grooves D (mm) | 73 | 73 | 73 | 73 | 73 | 73 |
| Average Groove Depth of Shallow Groove d (mm) | 23 | 23 | 23 | 23 | 23 | 23 |
| d/D | 0.32 | 0.32 | 0.32 | 0.32 | 0.32 | 0.32 |
| Eb (mm) | 374 | 374 | 374 | 374 | 374 | 374 |
| Em (mm) | 0 | 0 | 0 | 100 | 356 | 302 |
| Em/Eb | 0 | 0 | 0 | 0.27 | 0.95 | 0.81 |
| Slip Property (index) | 80 | 70 | 90 | 75 | 70 | 60 |
| Wear Resistance (index) | 98 | 96 | 98 | 98 | 96 | 95 |

TABLE 2

Figure 6:
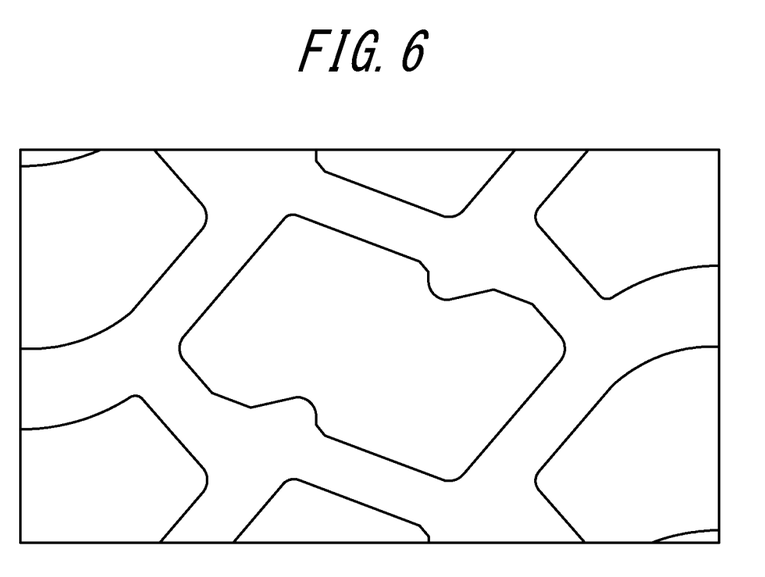
FIG. 6 is a partial development view illustrating a tread pattern of a Comparative Tire.

|  | Example Tire 7 | Example Tire 8 | Example Tire 9 | Example Tire 10 | Comparative Tire |
| --- | --- | --- | --- | --- | --- |
| Pattern | FIG. 3(b) | FIG. 1 | FIG. 5 | FIG. 5 | FIG. 6 |
| Lb (mm) | 258 | 258 | 289 | 289 | 258 |
| Lm (mm) | 258 | 145 | 205 | 205 | 0 |
| Lm/Lb | 1 | 0.56 | 0.71 | 0.71 | 0 |
| Ab (mm$^2$) | 53000 | 53000 | 75500 | 75500 | 53000 |
| Am (mm$^2$) | 12000 | 12000 | 18900 | 18900 | 0 |

TABLE 2-continued

|  | Example Tire 7 | Example Tire 8 | Example Tire 9 | Example Tire 10 | Comparative Tire |
|---|---|---|---|---|---|
| Am/Ab | 0.23 | 0.23 | 0.25 | 0.25 | 0 |
| Groove Depth of Circumferential Grooves D (mm) | 73 | 73 | 73 | 73 | 73 |
| Average Groove Depth of Shallow Groove d (mm) | 23 | 23 | 38 | 23 | 0 |
| d/D | 0.32 | 0.32 | 0.52 | 0.32 | 0 |
| Eb (mm) | 374 | 374 | 450 | 450 | 374 |
| Em (mm) | 252 | 421 | 534 | 534 | 0 |
| Em/Eb | 0.68 | 1.13 | 1.19 | 1.19 | 0 |
| Slip Property (index) | 65 | 45 | 20 | 30 | 100 |
| Wear Resistance (index) | 90 | 90 | 100 | 105 | 100 |

As is clear from the results in Tables 1 and 2, none of the Example Tires 1-6 have significantly worse wear resistance than the Comparative Tire, whereas the slip property is greatly reduced. It is therefore clear that the Example Tires 1-6 in which the blocks are each provided with one or more shallow grooves can greatly enhance driving performance in muddy areas through enhanced mud drainage, without leading to a severe deterioration in the block rigidity, which would degrade wear resistance.

As Tables 1 and 2 show, Example Tire 2, in which Am/Ab is greater than Example Tire 1, has a reduced slip property as compared to Example Tire 1 due to an increase in the groove area of the shallow groove, yet has slightly worse wear resistance. Furthermore, Example Tire 1 has a better slip property than Example Tire 3 as a result of effectively catching mud in the shallow groove due to the larger value of Lm/Lb than Example Tire 3. Example Tire 4 has a larger value for Em/Eb than Example Tire 1, thereby increasing the width direction component of the edges in the shallow grooves and achieving a better slip property than Example Tire 1. It is also clear that Example Tire 10, with a shallower average groove depth of the shallow grooves and a smaller value for d/D than Example Tire 9, cannot achieve as good of a slip property as Example Tire 9 due to a reduction in the volume of the shallow grooves in which mud can be caught.

As described above, these results show that the pneumatic tire for heavy load according to the present invention can effectively enhance mud drainage without severely worsening wear resistance.

REFERENCE SIGNS LIST

1,21: Tread surface
2, 22: Circumferential groove
3,23: Lug groove
4,24: Lug
5,25: Transverse groove
25a, 25b: Width direction portion
25c: Inclined portion
6, 26: Block
7-15, 27-29, 31: Shallow groove
16, 17, 30: Opening groove
18, 19: Concavity
C: Tire equatorial plane
Lb: Maximum length of block in tread circumferential direction
Lm: Circumferential distance of shallow groove
P1, P2: Circumferential end points of shallow groove
D1, D2: Outermost position of block in tread circumferential direction

The invention claimed is:

1. A pneumatic tire for heavy load comprising:
a tread, at least two circumferential grooves extending continuously in a tread circumferential direction, a plurality of transverse grooves opening to the circumferential grooves adjacent each other in a tread width direction, and a block defined by the circumferential grooves and the transverse grooves on a surface of the tread, wherein:
the block is provided with at least three shallow grooves having an average groove depth shallower than a groove depth of the circumferential grooves adjacent to the block,
the average groove depth is greater than 20% and less than 80% of the groove depth of the circumferential grooves adjacent to the blocks,
the shallow grooves include a circumferential shallow groove and a width direction shallow groove, which open to other grooves at both ends,
at least two of the shallow grooves open to at least one of the transverse grooves and the circumferential grooves adjacent to the block at both ends, and
at least one of the shallow grooves opens to the at least two shallow grooves.

2. The pneumatic tire according to claim 1, wherein a maximum length Lb of the block in the tread circumferential direction and a circumferential distance Lm between circumferential end points along outermost edges, in the tread circumferential direction, of the shallow grooves in each block satisfy the following relationship:

$$Lm/Lb>0.25.$$

3. The pneumatic tire according to claim 1, wherein an area Ab of a region enclosed by a perimeter of the block and a total groove area Am of the shallow grooves in the block satisfy the following relationship:

$$Am/Ab>0.20.$$

4. The pneumatic tire according to claim 1, wherein a length Eb of a projection in the tread width direction of an edge of the block and a sum of a length Em of a projection in the tread width direction of an edge of each of the shallow grooves satisfy the following relationship:

$$Em/Eb>0.8.$$

5. The pneumatic tire according to claim 1, wherein at least two of the shallow grooves open to both circumferential grooves adjacent to the block on either side in the tread circumferential direction.

6. The pneumatic tire according to claim 1, wherein at least two of the shallow grooves open to one of circumferential grooves adjacent to the block on either side in the tread width direction, and to one of transverse grooves adjacent to the block on either side in the tread circumferential direction.

7. The pneumatic tire according to claim 1, wherein the circumferential grooves are zigzag circumferential grooves that zigzag in the tread circumferential direction.

8. The pneumatic tire according to claim 1, wherein each transverse groove includes a bent portion at which the transverse groove bends.

9. The pneumatic tire according to claim 1, wherein the shallow grooves are provided on the block provided on a tire equator.

* * * * *